United States Patent [19]
Neukermans et al.

[11] Patent Number: 5,629,790
[45] Date of Patent: May 13, 1997

[54] MICROMACHINED TORSIONAL SCANNER

[76] Inventors: Armand P. Neukermans, 3510 Arbutus Ave., Palo Alto, Calif. 94303; Timothy G. Slater, 1226-25th Ave., San Francisco, Calif. 94122

[21] Appl. No.: 139,397

[22] Filed: Oct. 18, 1993

[51] Int. Cl.$^6$ .................................................. G02B 26/08
[52] U.S. Cl. ........................... 359/198; 359/199; 359/201; 359/202; 359/203; 359/214; 359/224; 250/234
[58] Field of Search ....................... 359/196–199, 359/201–203, 212–214, 223–226, 230, 290–293; 250/230, 234; 310/15, 36, 40 MM

[56] References Cited

U.S. PATENT DOCUMENTS

| | | |
|---|---|---|
| 4,317,611 | 3/1982 | Petersen . |
| 4,468,282 | 8/1984 | Neukermans ............................ 156/633 |
| 4,732,440 | 3/1988 | Gadhok . |
| 4,942,766 | 7/1990 | Greenwood et al. ................. 250/201.1 |
| 5,016,072 | 5/1991 | Greiff ......................................... 357/26 |
| 5,202,785 | 4/1993 | Nelson .................................... 359/214 |

OTHER PUBLICATIONS

Diem, B. et al., "SOI (SIMOX) As a Substrate for Surface Micro-machining of Single Crystalline Silicon Sensors and Actuators", The 7th International Conference on Solid-State Sensors and Actuators, (1993), pp. 233–236.

K. Petersen, "Silicon Torsional Mirror", Proceedings of the IEEE vol. 70, No. 5, May 1982, p. 61.

B. Wagner et al., "Electromagnetic Microactuators with Multiple Degrees of Freedom", International Conference on Solid-State Sensors and Actuators, Digest of Technical Papers, (1991), (IEEE Cat. No. 91CH2817–5) pp. 614–617.

V.P. Jaecklin et al., "Mechanical and Optical Properties of Surface Micromachined Torsional Mirrors in Silicon, Polysilicon and Aluminum", The 7th International Conference on Solid-State Sensors and Actuators (1993), pp. 958–961.

R.N. Kleiman et al., "Single-crystal silicon high-Q torsional oscillators", Rev.Sci.Instrum. 56(11), Nov. 1985, pp. 2088–2091.

R.A. Buser et al., "Very High Q-factor Resonators in Monocrystalline Silicon", Sensors and Actuators, A21–A23 (1990), pp. 323–327.

Breng, U. et al., "Electrostatic micromechanic actuators", Journal of Micromechanics and Microengineering 2 (1992) 256–261. no month.

Pfann, W. G. et al., "Semiconducting Stress Transducers Utilizing the Transverse and Shear Piezoresistance Effects", Journal of Applied Physics, vol. 32, No. 10, Oct. 1961, pp. 2008–2016.

*Primary Examiner*—James Phan
*Attorney, Agent, or Firm*—Donald E. Schreiber

[57] ABSTRACT

A frequency-locked torsional scanner of the type having a micromachined mirror formed on a surface of a silicon wafer section supported within a larger wafer section by a pair of opposed torsion bars. The principal vibrational frequency of the mirror is selected to be at least 20% higher than other modes of vibration. To prevent breakage, the torsion bars are hardened by conversion of at least a surface layer to silicon carbide or nitride. A pair of scanners with orthogonal torsion bars may be mounted in a vacuum enclosure for two-dimensional scanning at different rates suitable for television display. In alternate embodiments, a detector and a scanner may be built on a plate on the same supported wafer section or two scanners may be independently supported or one scanner and one detector may be independently supported as two plates. The mirror may be driven electrostatically, magnetically, or by both methods.

41 Claims, 11 Drawing Sheets

MICROMACHINED TORSIONAL SCANNER

DESCRIPTION

1. Technical Field

The invention relates to optical beam scanners and, in particular, to micromachined vibratory scanners.

2. Background Art

Beam scanners are used in digital imaging, printing, bar code readers, optical reading and writing systems, surface inspection devices and various scientific and industrial implements. Such scanners deflect a beam of light, usually from a fixed source, over an angle ranging from several degrees to tens of degrees. The beam sweeps back and forth at a frequency determined in part by the mirror resonant frequency. A typical vibrational scanner of the prior art is described in U.S. Pat. No. 4,732,440 to J. Gadhok. The idea of making torsional scanners within a silicon body was proposed at an early date by K. Peterson, Proc. IEEE, vol. 70, no. 5, p. 61, May 1982. See also U.S. Pat. No. 4,317,611 to K. Peterson.

Figure 1:
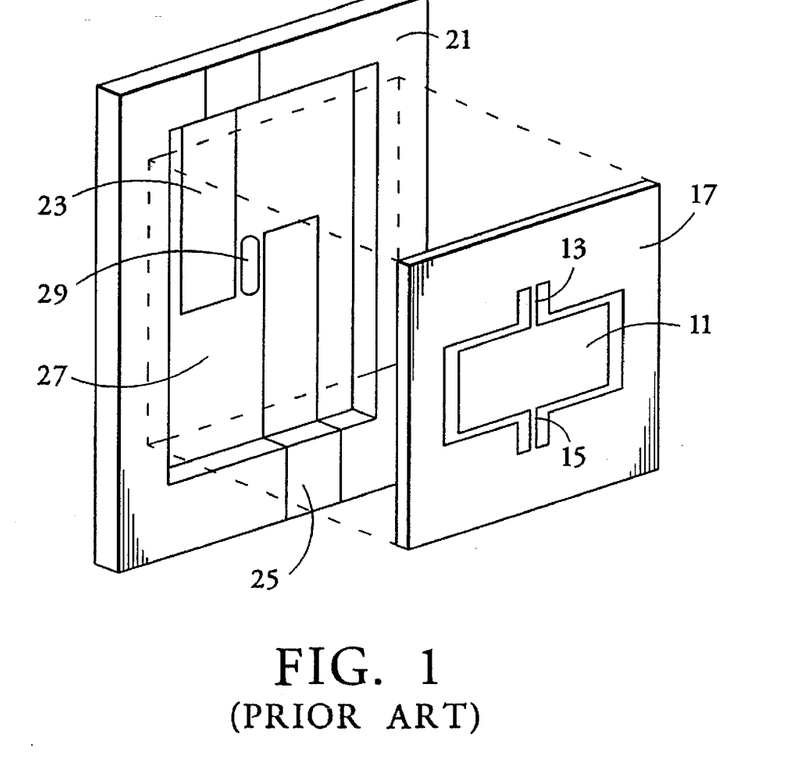
FIG. 1 is a perspective assembly view of a micro scanner of the prior art.

FIG. 1, depicting a scanner shown in FIG. 39 of Peterson, Proc. IEEE, supra, p. 61, includes a micromachined torsional mirror 11, supported by torsion bars 13 and 15 within silicon body 17 ("micro scanner" hereafter). The aforementioned article describes typical mirror parameters, such as the modulus of silicon, the typical wafer thickness, the length of the torsion bar and the dimensions of the mirror. The width of the torsion bars is on the order of 500 micrometers, while the length of the torsion bars is approximately 0.2 centimeters. The mirror is approximately 0.22 centimeters on a side. The cut which isolates the mirror from the silicon body and also defines the torsion bars is approximately 0.02 centimeters in thickness. Each cut is made by anisotropically etching the silicon. The silicon body rests on glass substrate 21 which has vapor deposited electrodes 23 and 25. A depression 27 is etched into the glass to receive silicon body 17 which rests on a linear support ridge 29. A high voltage is applied first to one electrode then the other in a continuing out-of-phase sequence from a drive circuit. The electric field generated by the electrodes tilts the mirror first to one side and then the other. The restoring force of the torsion bars works against each deflection. The resonant frequency of the mirror can be calculated with well known formulas cited in the above-mentioned articles, although air damping creates an error in the resonance frequency. The substrate, electrodes and drive circuit are part of the micro scanner.

Two dimensional micromachined silicon flexure structures, used as gyroscopes, are known in the art. See U.S. Pat. No. 5,016,072 to P. Greiff. Such structures are similar to micro scanners in construction and vibratory characteristics.

One of the problems encountered in the prior art is in restricting vibrations to a single desired torsional mode. An object of the invention was to devise a micro scanner which vibrates at a single desired mode of vibration and to be self-oscillating at its natural fundamental frequency.

SUMMARY OF THE INVENTION

The above object was achieved in a micro scanner having a primary vibrational mode, the torsional vibration mode, substantially lower in frequency from other modes by at least 20%. By providing the specified frequency separation, the micro scanner will respond primarily to the desired mode. Mirror thickness, torsion bar length, mirror dimensions, as well as drive characteristics can all define the vibrational mode spectra. Choices are made empirically. In contrast, while the prior art recognized the existence of other vibrational modes, no attention was paid to separation of the frequency of the lowest mode. We have discovered that by separating the torsional mode frequency from other vibrational modes, energy transfer into the principal vibrational mode, the torsional oscillation mode, is enhanced and other undesired modes are suppressed.

It has also been discovered that other silicon structures can complement a micro scanner. For example, a second mirror which is arranged to vibrate out of phase with the first mirror can cancel torques injected into the support structure. Another example is a silicon detector which can be made to surround or be adjacent to the mirror. An advantage of such a structure is that the mirror and the detector can share common torsion bars so that the mirror and detector always point in the same direction and the mirror receives a constant collection angle. This solves the problem of correctly aiming a detector to receive a reflected beam. Another structure is a pair of plates, each supported by torsion bars within one silicon frame, with the plates driven in phase. Both plates may be mirrors or one plate may be a mirror and another plate a photodetector, or both are combined mirror-detectors. Yet another structure is a two-dimensional scanner in which two sets of torsion bars are provided to two concentrically mounted frames supporting a single mirror. One frame causes scanning at a first rate while the second frame causes scanning at a second rate. Such an approach would be useful for raster scanning because the horizontal scan rate is usually at a substantially higher frequency than the vertical scan rate.

A micro machined container has been devised having a thin tough transparent window which can maintain vacuum conditions inside the container, but allow the beam to be reflected from the mirror without substantial beam aberrations.

Micro scanners of the present invention may be driven electrostatically from the front or back sides of the mirror, or both. In addition, a magnet and galvanometer type drive may be used above or in combination with an electrostatic drive. An integrated torsion sensor is used for either stimulating self-resonance or as an angle sensing device for feedback control of mirror position.

BEST MODE FOR CARRYING OUT THE INVENTION

Figure 1A:
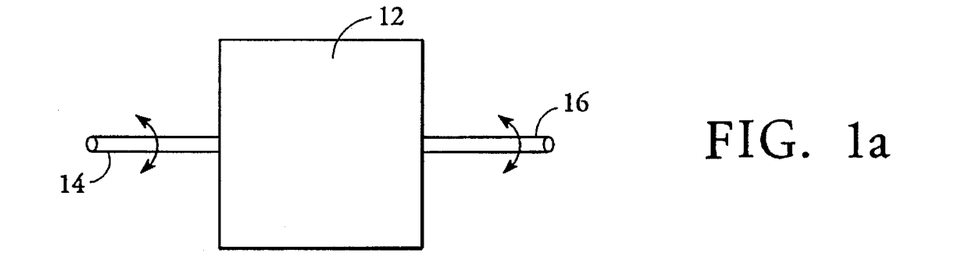
FIGS. 1a–1e illustrate micro scanner mirror vibrational modes.
Figure 1B:
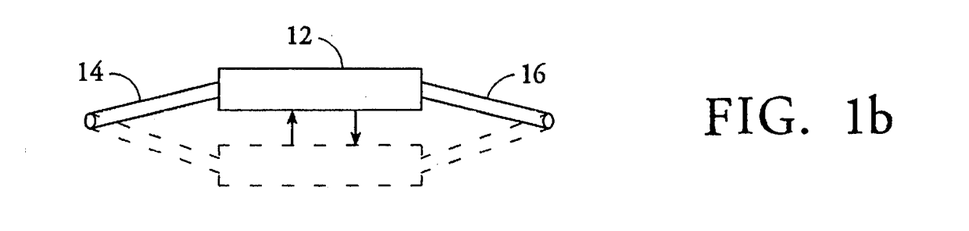

With reference to FIGS. 1a–1e, various vibrational modes of torsional scanners are shown. FIG. 1a depicts a top view of a desired or principal torsional mode of a micro scanner in accord with the present invention. This mode is designated as mode 1 herein. The scanning mirror 12 has opposed axes 14 and 16 which twist in the direction shown by the arrows. In FIG. 1b, a vertical shaking mode is shown in a side view wherein the mirror 12 is moving up and down in the directions shown by the arrows, leaving a horizontal plane. This mode is designated as mode 2 herein.

Figure 1C:
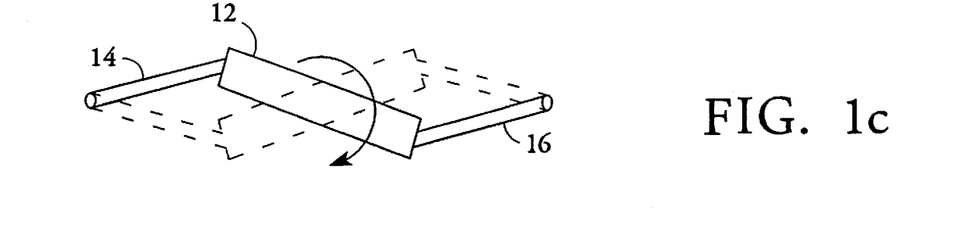
Figure 1D:
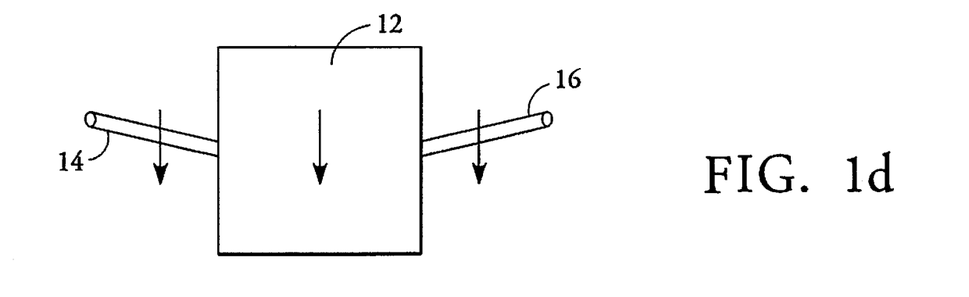
Figure 1E:
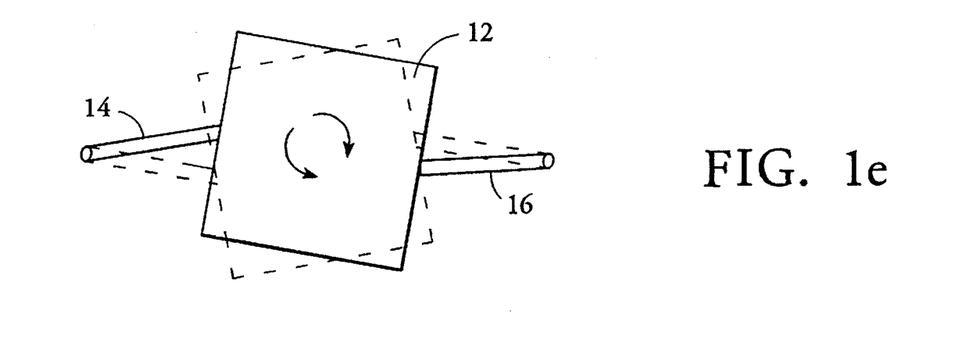

FIG. 1c shows mirror 12 in a vertical rocking mode in which the mirror also leaves a horizontal support plane at the ends of the mirror, but not at the center. This is herein designated as mode 3. FIG. 1d shows a lateral shaking mode where the mirror 12 moves first in one direction, then in an opposite direction within the support plane. This will be termed mode 4 herein. FIG. 1e shows a lateral rocking mode in which the mirror 12 twists in one direction, then twists in an opposite direction, within the horizontal support plane. This will be termed mode 5 herein. Modes 2–5 are undesired, but cannot be completely eliminated. Other modes, called plate modes, are possible but for most applications, the frequency of plate modes are much higher and would be removed if separation is achieved with respect to the modes which have been illustrated. More complex modes are also possible, again usually at higher frequencies. In the present invention, the frequency of modes 2–5 is separated from the frequency of mode 1 by a minimum frequency ratio. By maintaining an adequate separation, between the lower torsion mode and the next higher mode, less energy is transferred to these undesired modes. In the present invention, the frequencies of the various modes are shown in the following table for a typical configuration:

TABLE 1

| | Vibrational Frequency (Hz) | | | |
|---|---|---|---|---|
| | Mode 1 | Mode 2 | Mode 3 | Mode 4 |
| High Freq | 14,100 | 71,400 | 123,000 | 214,000 |
| Mid Freq | 1,500 | 3,200 | 5,500 | 15,900 |
| Low Freq | 92 | 930 | 1,600 | 18,500 |

In general the separations described above for the torsional mode at any given frequency range are achieved by designing the torsion bars as thin and narrow as possible, yet adequately thick to withstand impact forces in the environment in which the micro mirror is used. When driving a micromachined mirror, certain forces described below are applied asymmetrically. For example, spaced apart electrodes can drive one-half of the mirror and then at a later time the other half. On the other hand, other forces, such as magnetic forces, cause a symmetric application of the driving couple. In the symmetric application, the vibrational frequency of the torsional mode may be closer to the undesired modes, say within twenty percent. For the asymmetric application, the separation should be at least thirty percent.

Figure 2:
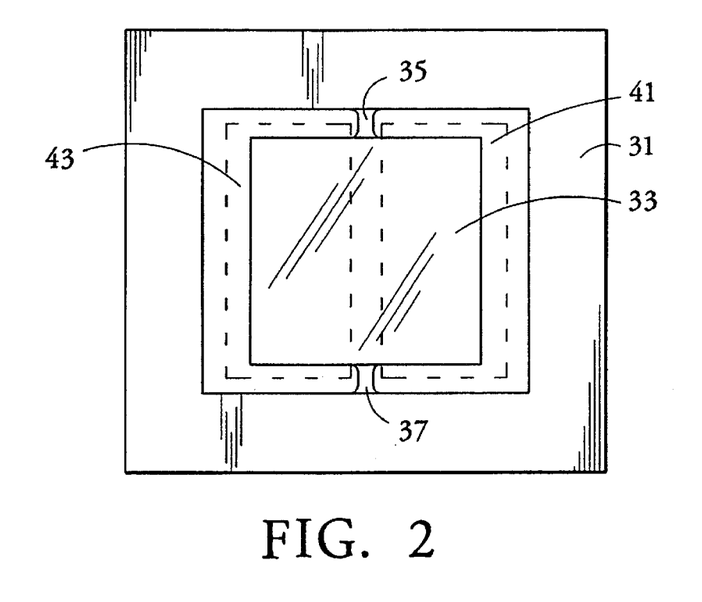
FIG. 2 is a top view of a micro scanner in accord with the present invention.

With reference to FIG. 2, a section 31 of a silicon wafer is shown. The wafer is etched to define a smaller wafer section 33 supported within the larger section 31 by means of torsion bars 35 and 37 which are integral to both sections. The surface of smaller section 33 is polished in the manner of commercial silicon wafers so that it has a shiny, reflective surface. Mounted either below or above the wafer and slightly spaced therefrom are the electrodes 41 and 43, indicated by dashed lines. These electrodes will be alternately charged by voltages which cause electric fields which attract the smaller section 33, hereafter referred to as mirror 33, which is electrically grounded through the torsion bars and to the surrounding larger section. Note that there is no fulcrum or backplane support as in FIG. 1. Only the torsion bars provide support. Apart from this, the overall design of the scanner mirror of the present invention, up to this point, may be in accord with the prior art. However, the mass of the mirror and the dimensions of the torsion bars and perhaps other variables are selected so that the torsional mode is well separated. Also, the electronic circuitry associated with one of the torsion bars, described below, as well as torsion bar support radii are new.

Figure 2A:
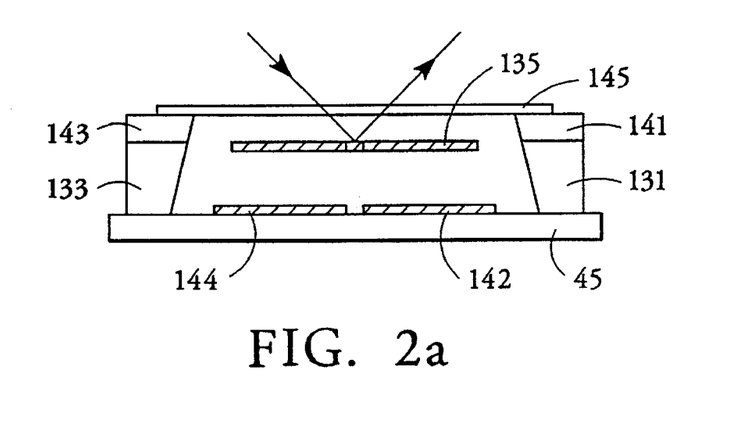
FIGS. 2a, 2b, 2c and 2d are side plan views of alternative micro scanners in accord with the present invention.

In FIG. 2a, the electrodes 142 and 144, corresponding to electrodes 41 and 43 in FIG. 2, are shown on an insulative substrate 45. The larger wafer section has opposite sides 131 and 133 which are disposed on the glass substrate 45 and have a rectangular shape similar to the section 31 of FIG. 2. The mirror 135 is supported by torsion bars from the larger silicon section in a position spaced above the electrodes 142 and 144. Above the sides 131 and 133 at the larger silicon frame is a portion of a second wafer having opposed edges 141 and 143. Optionally, the edges 141 and 143 support a vapor deposited very thin membrane window 145 (or any transparent window) if a sealed container is desired.

Figure 2B:
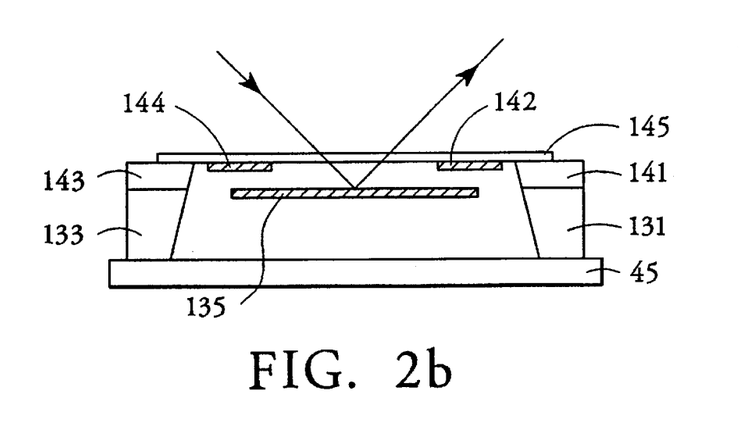

The entire structure is fabricated using semiconductor processing techniques. Atop the dielectric substrate 45, the electrodes 142 and 144 are vapor deposited metal stripes which are patterned on the silicon dioxide coating on the substrate 45 using standard photolithographic techniques. The silicon section having sides 131 and 133 and the integral mirror 135 are separately fabricated by anisotropically etching a silicon wafer. Only opposed torsion bars support mirror 135. The micromachined silicon housing described above is preferred, but not necessary. A conventional box with a transparent top could also be used. When a membrane window is used, the window is made sufficiently tough so that transparent electrodes may be deposited directly on the membrane. With reference to FIG. 2b, electrodes 142 and 144 are very thin indium tin oxide stripes deposited on window 145. The stripes may be only a few molecular layers in thickness because very little current is conducted by the electrodes.

The thickness of the mirror 12, 33 or 135 may be equal to the thickness of the wafer, or less. For high frequencies of operation, the mirror thickness is typically a fraction of the wafer thickness. Mirror thickness may range from less than one micron to tens of microns. The preferred method of manufacture, involves use of a Simox wafer, or similar wafers, e.g. silicon on insulator substrates, where the mirror thickness is determined by an epitaxial layer. Single crystal silicon is preferred both for the mirror and the torsion bars because of its superior strength and fatigue characteristics, as compared to metals or polysilicon. For low frequencies of scanner operation, typically below 100 Hz, if the mirror's thickness equals only that of the epitaxial layer, then the length of the torsion bars makes them too fragile to withstand liquid processing or shock within their working environments. The full thickness of the wafer's epitaxial layer should be used to form the torsion bars in this situation. The torsion bars would now be much broader and shorter, but their thickness would still be set by the epitaxial layer's thickness. However, the mirror would be much thicker equaling the total wafer thickness depicted in FIG. 3a. The wafer about the mirror's mass around the center can be mostly etched away producing a box frame structure such as that illustrated for the frame 207 depicted in FIGS. 12a and 12b. This affects the resonance frequency very little, as well as the moment of inertia, but reduces the mass of the mirror and hence the forces on the torsion bars. Construction of the thicker section is explained below with reference to FIG. 3a.

Once completed, the larger structure has a light transmissive window mounted above the scanning mirror. This is done by taking a second silicon wafer and vapor depositing a layer of silicon nitride, silicon carbide or boron nitride over the wafer and then etching away the supporting wafer down to the thin vapor deposited film. A thin layer of Si could also be used. The edges 141 and 143 are sides of a second wafer structure joined to opposing edges 131 and 133 of the larger section of a first wafer structure. The two congruent wafer sections are joined by a variety of processes such as anodic bonding, silicon to silicon bonding, solder glasses, etc. all done in a vacuum environment. This creates vacuum conditions inside of a closed container. The method of manufacturing the thin window 145 is described in U.S. Pat. No. 4,468,282 to A. Neukermans. The patent describes thin films having a thickness in the range of a few microns. The area of the window for a micro scanner would be about 3 mm×3 mm. The advantage of such thin films is that optical aberrations are eliminated. The film which is selected should be substantially transmissive of light, with little absorption so that the film will not be damaged by an incident laser beam. By providing a vacuum container for mirror 135, damping due to air is eliminated and the mirror will oscillate to frequencies ranging up to several tens of thousand hertz. It should be noted that a vacuum enclosure is not necessary, but greatly helps in reducing the voltage needed for electrostatic drive, as well as for magnetic drive. Because the micromachined mirrors are difficult to clean, a dust cover is preferable. The windows, in a non-vacuum environment, serve as a dust cover. Large electrostatic voltages attract particles to the surface of the mirror and so the enclosure serves several purposes.

Figure 2C:
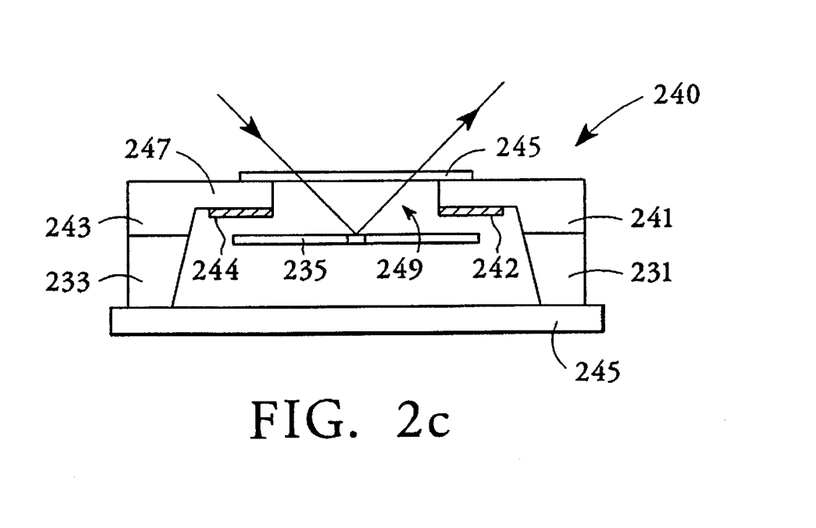

The mirror construction of FIG. 2c is similar to the construction of FIG. 2a. In this case, the insulative substrate 245 supports the larger wafer section having side walls 231 and 233. The smaller wafer section 235 is supported by torsion bars within a frame defined by the larger wafer section, as in FIG. 2. A second wafer 240 has a vapor deposited thin film window 245 thereover which is similar in materials and construction to the thin film window 145 in FIG. 2a. The second wafer 240 has side walls 241 and 243 and a bottom wall 247 with an etched opening 249 below the film 245. The bottom wall portion 247 overhangs mirror 235 and has electrode stripes 242 and 244 on the underside of the bottom wall 247 facing mirror 235. Just as previously mentioned, the electrode stripes 242 and 244 are conductive material that is vapor deposited once the bottom wall 247 has been formed by etching the second wafer and an oxide coating applied. The electrode stripes 242 and 244 perform the same function as previously, deflecting mirror 235 by electrostatic force generated by alternate high voltages applied to the electrodes. Because of the overhang of bottom wall 247 over the mirror 235, the opening 249 will not be as large as the opening provided in FIG. 2a where the mirror drive force is from the rear of the mirror. It is possible for auxiliary stripes, not shown, to be placed below the mirror in FIGS. 2a and 2b so that electrodes are both above and below the mirror. Drive forces are synchronized between top and bottom electrodes so that diagonally spaced electrodes are both pulling. This symmetric pull relationship between electrodes above and below the mirror will strengthen the vibratory force applied to the mirror and will assist in principal mode selection because of the symmetry.

Figure 2D:
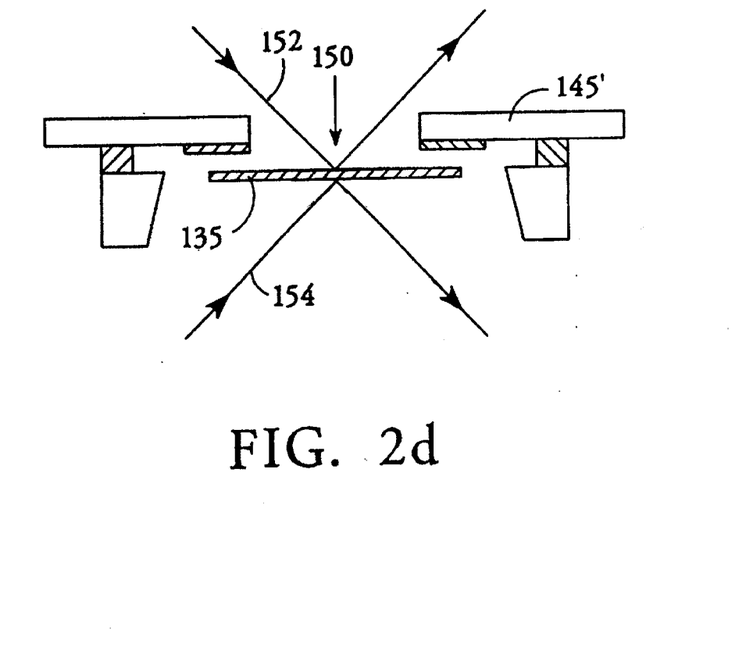

In FIG. 2d mirror 135 is made reflective on both sides. The thin window 145' has a central opening 150 which admits a beam 152 directed toward the center of vibration of the mirror. A similar beam 154 is directed to the back surface of the mirror. In this manner, both front and back surfaces of the mirror can deflect different beams.

Figure 3:
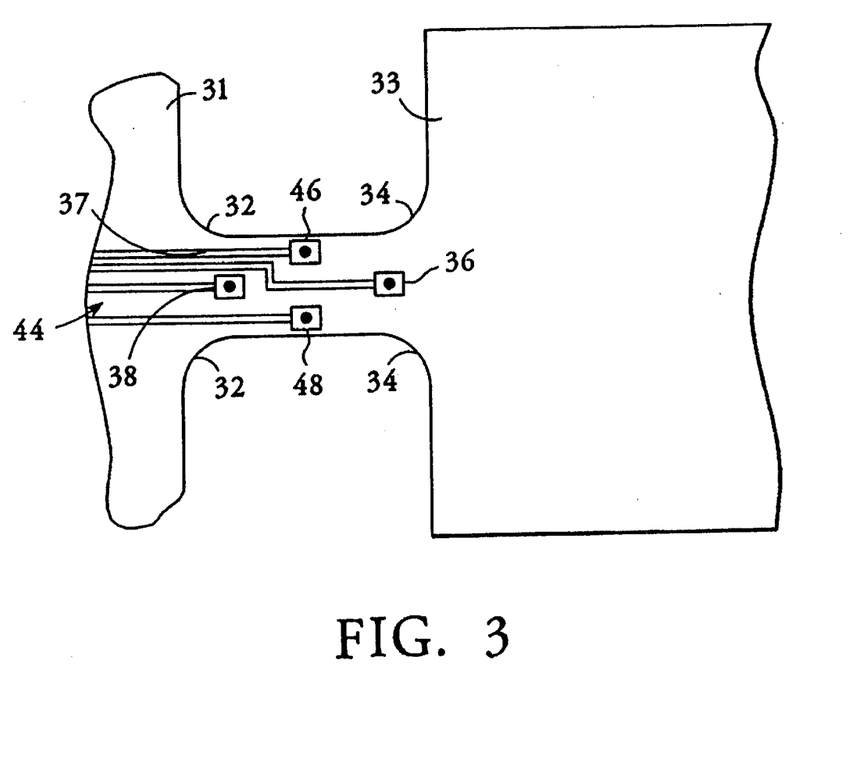
FIG. 3 is a top detail view of a portion of a torsion bar of a micro scanner in accord with the present invention.

In FIG. 3, a detail of torsion bar 37, suspending mirror 33 from the larger section 31 of a silicon wafer. The torsion bar 37 may be seen to have rounded corners 32, 34 formed by an anisotropic silicon etch. The rounding of corners removes stress concentrations. The radius of rounding should be at least equal to the thickness of the torsion and preferably it should be near the width of the torsion bar.

Figure 3A:
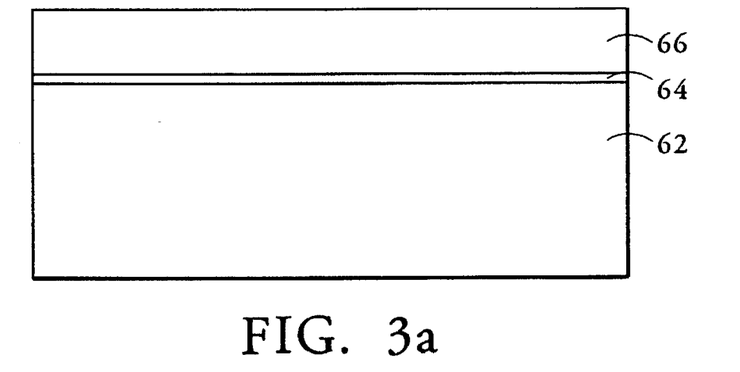
FIGS. 3a and 3b are side plan views of a method of making a micro scanner in accord with the present invention.
Figure 3B:
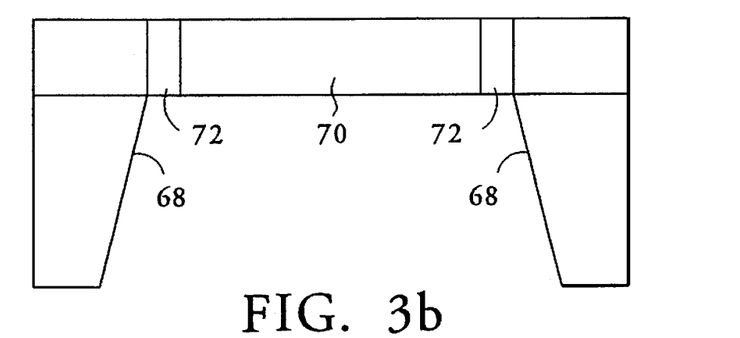
Figure 3C:
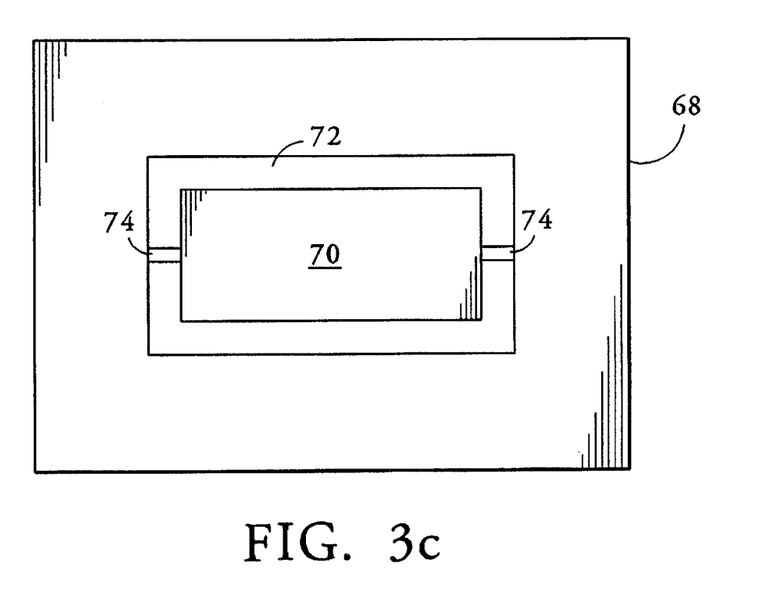
FIG. 3c is a top plan view of the micro scanner shown in FIG. 3b.

In fabricating torsional scanners in accord with the present invention, commercially available Simox wafers are preferred as substrates for construction of the torsional scanners. With such wafers, the silicon left standing after etching, is single crystal and stress free. The silicon does not curl, which is extremely important for mirror applications. Three well-controlled thicknesses of the mirror plate and torsion bars are obtained, giving well-controlled results over the entire wafer. Simox wafers have a built-in etch stop which greatly eases fabrication of mirror and hinges. Thick uniform mirror plates and torsion bars are made in this way, with thicknesses up to 100 microns. Germanium-compensated boron-doped silicon, and electrolytic etching of epitaxial layers can also be used. In FIG. 3a, a Simox wafer is illustrated. The top epitaxial layer 66 is a few to 50 microns thick, the silicon dioxide layer 64 is about 2,000 Åthick and the base layer 62 is typically a 500 micron layer of single crystal silicon. A cavity is etched from the backside of the wafer, using standard and anisotropic etchants, such as EDP. This etch is automatically stopped at the oxide layer 64. Subsequently, the epitaxial layer 66 of the wafer is patterned to define a mirror 70 and torsion bars 74. The oxide layer 64 is removed in the desired places and the exposed patterned silicon is etched in a reactive ion etch reactor, using, for example, chlorine as an etchant. This now delineates in the epitaxial layer 66 the mirror 70 and torsion bars 74 and produces straight walled torsion bars 74. An anisotropic etchant could also be used, producing a trapezoidal cross-section for the torsion bars 74. After removal of all oxides, the mirror is free standing and can be coated with thin layers of metal or dielectric to enhance reflectivity. Note that in FIG. 3b, the cuts 72 in the epitaxial layer 66 are made concurrently with definition of the mirror 70 and the torsion bars 74 which support the mirror within the supporting silicon wafer portion 68.

To form the torsion bars, the front side of the wafer is patterned. The front mask is aligned to the back side of the wafer, with a two-sided aligner. Oxide layer 64 is removed after patterning and the exposed silicon is etched in a reactive ion etch reactor, using chlorine as an etchant. This procedure gives rise to a straight walled torsion bar 74. Alternatively, the cuts 72 and the torsion bars 74 may be etched using anisotropic etchants such as KOH or ED, or isotropic etchants such as $HF/HNO_3/H_2O$. Oxide is again removed, leaving free standing torsion bars supporting the mirror.

An alternate etch stop technique is the well-known electrochemical etch stop. In this method, an n-type layer is epitaxially grown on a p-type substrate. By applying a voltage to the n-layer during the etch, it is possible to etch the p-type substrate without etching the n-layer (see ref.). This method can be used to make n-type membranes of precisely determined thickness, which can then be patterned and etched to form mirrors.

As an alternative to an etch stop layer, a plain silicon substrate can be time etched to form membranes of the desired thickness, which can then be patterned and etched to form mirrors.

In achieving maximum deflection, breakage of the torsion bars is a risk. However, since cracks usually originate and propagate from the surface, the surface can be hardened by conversion of the surface into silicon carbide or silicon nitride. This is done by exposing the surface of the bars to hydrocarbons or ammonia for nitridation at 900° C. This causes the top several thousand angstroms of silicon to be converted into silicon carbide or silicon nitride. See also the method of J. Graul and E. Wagner, Applied Physics Letters, 21, No. 2, p. 67 (1972) relating to conversion of monocrystalline silicon to polycrystalline β-silicon carbide using methane. The scanner mirror must be protected with oxide during the silicon hardening process. The tensile strength of silicon carbide is approximately three times that of silicon.

Referring again to FIG. 3, before the etching of the mirror and torsion bars, a first pair of contact pads 36 and 38 are aligned along the axis of the torsion bar. A second pair of contact pads 46 and 48 are transverse to the first pair. Each of the contact pads has a respective wire lead 44 deposited on the torsion bar leading outwardly to the larger section of wafer material and to electrical connection with the circuitry described herein. Contact pads 36 and 38 are provided for the purpose of establishing a current flow generally coaxial with the torsion bar axis and between the contact pads 46 and 48. Actually, only one pad 36 could be used as a current injection point and the two nearest pads used as current sinks. Torsion in the bar then causes the ratio of the currents to change. Upon twisting of the torsion bar, a voltage is generated between pads 46 and 48. The mutually orthogonal contact pads 36, 38 and 46, 48 may be used in two ways. In one mode, the torsion sensor is used for self-oscillation of the resonant structure. The generated voltage is used in a positive feedback scheme, by reinforcing this signal with force members which apply electrostatic or electromagnetic forces to the mirror, making the mirror resonate at its principal torsional frequency. In a second mode, the transverse voltage generated by the twisting mirror is a transducer, measuring angular deflection of the mirror, and so the signal may serve to indicate the angle at which a beam is being deflected.

In the situation where a DC voltage is applied across pads 36 and 38, slight movements of the torsion bar are converted to vibrations at the resonant frequency of the torsion bar. In this sense, the electrical sensor is a feedback mechanism which helps the mirror attain resonance at the principal vibrational frequency. If an AC current is applied to the sensor, say 20 kHz, then the torsion signal becomes a modulation envelope of the imposed frequency. The benefit of the modulation envelope is that it is easier to detect and thus monitor vibrational modes, beam position or the like in the presence of large drive signals. The torsion bar is preferably aligned in the <110> direction for n-type silicon or the <100> direction for p-type silicon. These orientations are not only optimal for shear stress, but these arrangements are nearly insensitive to uniaxial strains in these orientations.

Figure 4:
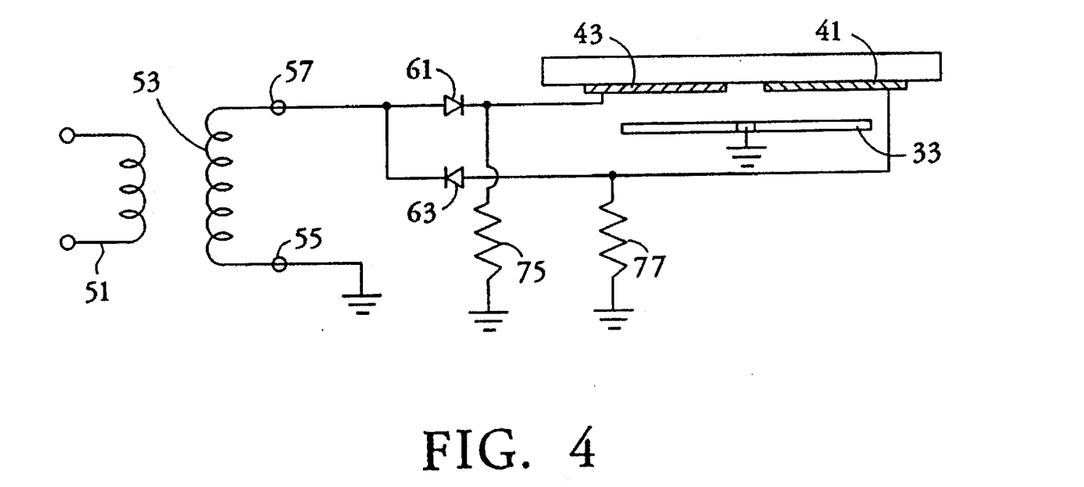
FIG. 4 is an electrical schematic of an electrical circuit for driving the electrodes of the micro scanner of FIG. 2.
Figure 4A:
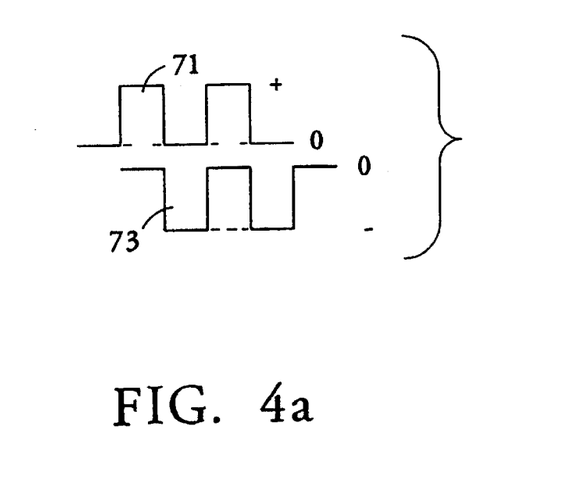
FIG. 4a is a waveform diagram for rectified current to the stripe electrodes in FIG. 4.

In FIGS. 4 and 4a, an electrical circuit is shown which provides the drive signal for the stripe electrodes 41 and 43 in FIG. 2. A sinusoidal or square wave low voltage input signal is applied to transformer primary winding 51. The secondary winding 53 of a ferrite core transformer steps up the input voltage to a higher level at a 50 to 1 turns ratio. A commercially available part such as Phillips 36222 PL00-3E2A will suffice. The secondary winding 53 has a grounded side 55 and a hot side 57 which is rectified by one or more diodes 61 in a first leg and one or more reversed biased diodes 63 in a second leg. The diode string 61 of the first leg provide a rectified half wave 71 to electrode 43. The reversed biased diode string 63 provides a rectified half wave 73 to electrode 41 at peak voltages as high as 1000 volts. High value bleed-off resistors 75 and 77, about 10M ohms, are used to discharge the plates. These voltages which are seen in FIG. 4a to alternate from positive to negative corresponding to one electrode then the other, pulling from one side then the other, causing mirror reciprocation.

Figure 5A:
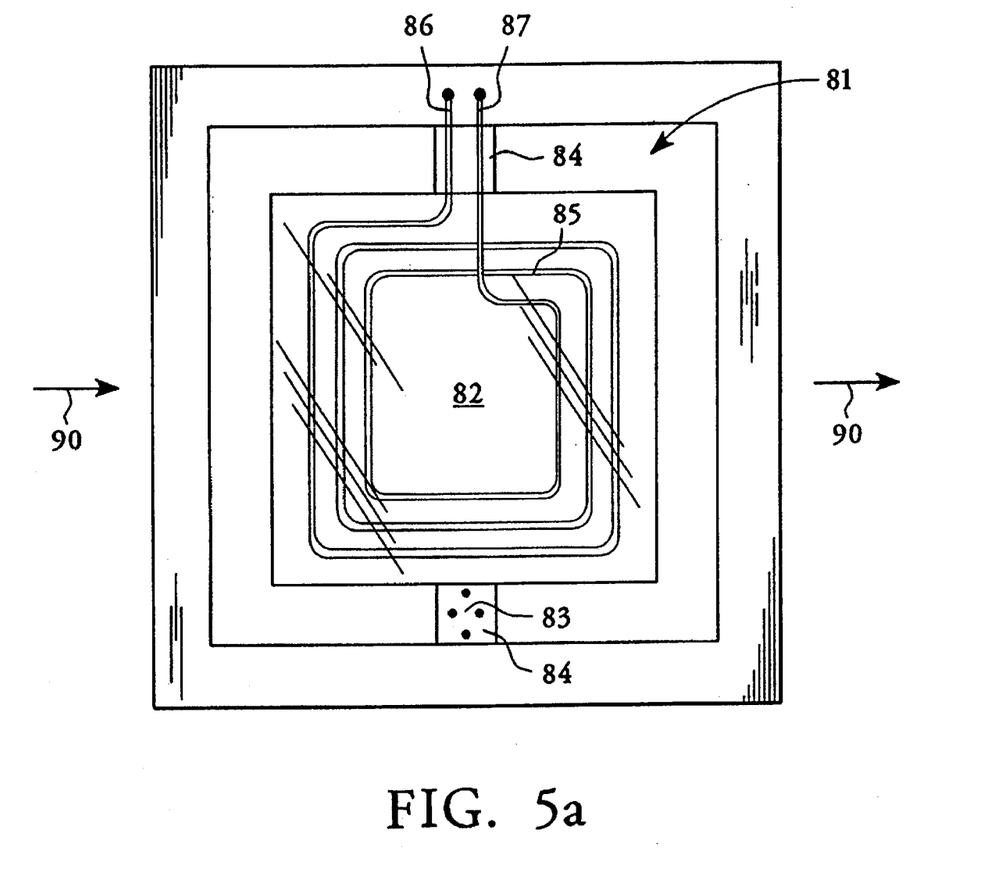
FIG. 5a is a top plan view and FIG. 5b is a side plan view of a micro scanner of the present invention with a galvanometer coil drive apparatus.
Figure 5B:
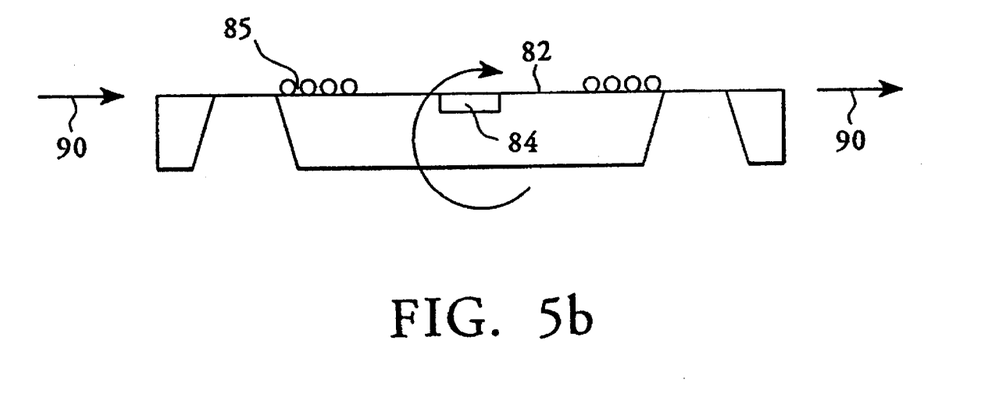

With reference to FIGS. 5a and 5b a torsional scanner 81 is shown having a central mirror 82, torsion bars 84, contact pads 83 to be used as a position sensor in accord with the description given in relation to FIG. 3, and a circumferential loop coil 85. The coil 85 is a conductive loop which may be formed by patterning or vapor depositing conductive material onto the silicon mirror 82 about the periphery thereof. The object is to establish a magnetic field within the coil perpendicular to the mirror. The coil or loop is insulated with silicon dioxide or another insulator. The conductive crossover of conductor 87 is accomplished by well known layering techniques. Alternatively, conductor 87 can be terminated prior to the crossover location and, if the underlying silicon is sufficiently conductive, may be used as a ground return path. Current is brought into the coil by means of a conductor 86 on hinge 84 and current is removed by conductor 87. An external magnetic field is applied parallel to the plane of mirror 82, as indicated by arrows 90. The magnetic field applies a moment to the mirror when current flows in the coil 85 tending to turn the mirror out of its starting plane. This force is balanced by torsion in the torsion bars and is measured by an angle transducer associated with the contacts 83. The coil 85 thus behaves like a galvanometer coil, with greater amounts of current causing greater amounts of deflection. Before the limit is reached, current may be reversed and the mirror will rotate in the opposite direction. In this manner, a miniature scanning mirror, driven by magnetic forces may be built. The signal from the torsion sensor 83 can be used, in the feedback loop, to provide any desired scan profile, such as a linear or sinusoidal scan. Electrostatic forces can also be used in the feedback scheme, but are more prone to instabilities. Also, the magnetic driver described above may be combined with the electrostatic driver previously described.

Figure 6:
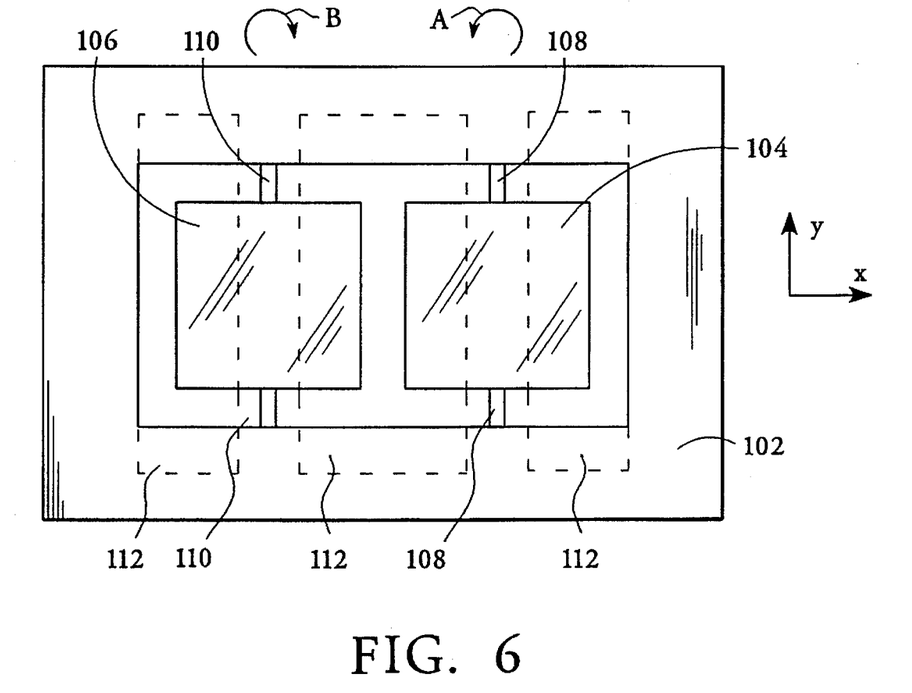
FIGS. 6 and 7 are top plan views of two different embodiments of dual mirror scanners in accord with the present invention.

FIG. 6 shows that a single silicon frame 102 may support a pair of micro scanners 104 and 106, each supported by a pair of torsion bars 108 and 110, respectively. Stripe electrodes 112 beneath the two mirrors provide torques in opposed phases so that the mirrors reciprocate as indicated by the arrows A and B, i.e. oppositely. By applying opposite torques to the two mirrors, the torques transferred to the larger silicon section 102 cancel each other, thereby lessening vibration which must be absorbed by the larger section.

Figure 7:
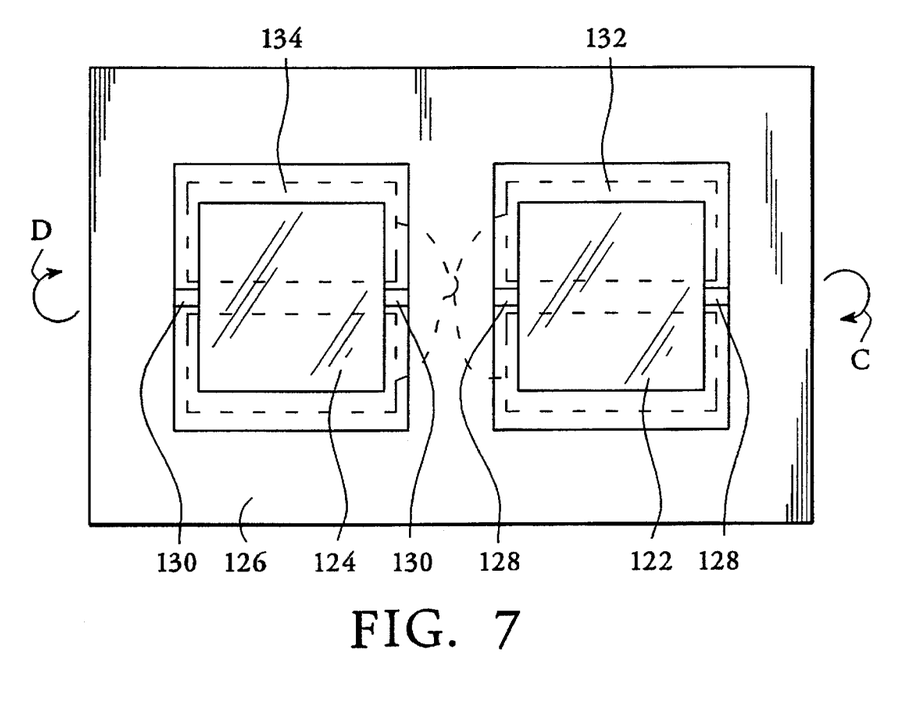

In FIG. 7, a pair of mirrors 122 and 124 are supported within the larger silicon section 126. The mirrors are supported in a closely spaced relationship by torsion bars 128 and 130 with driver stripes 132 and 134, indicated by dashed lines, below the respective mirrors. The plates drive the mirrors in an out-of-phase manner, as in FIG. 6, indicated by the arrows C and D. Once again, the out-of-phase relationship of the two mirrors removes vibration in the larger frame 126 by nulling opposing torques. Since the mirror resonators are close together, as defined by a lithographic process, they are likely to be nearly identical in resonance characteristics, and their amplitudes (and Q) are expected to be nearly identical. To further tune and equalize the resonance frequencies, laser trimming can be used either to remove deposited metal on the silicon surface, or from the hinge, or part of the silicon section itself. Hence, almost complete cancellation of the torques takes place. With this arrangement, mirrors with resonant frequency differences as small as one part in 1,000 have been made and torques have been cancelled to within a few percent, without any laser trimming of the mirrors. It should be noted that when this arrangement is used in a x-y drive, then the arrangement of FIG. 6 is preferred. This arrangement allows for larger angles around the x-axis because the extent of the mirror arrangement is smaller in the y direction. Any combination of oscillating plates can be used, so long as the total torques cancel.

Figure 8:
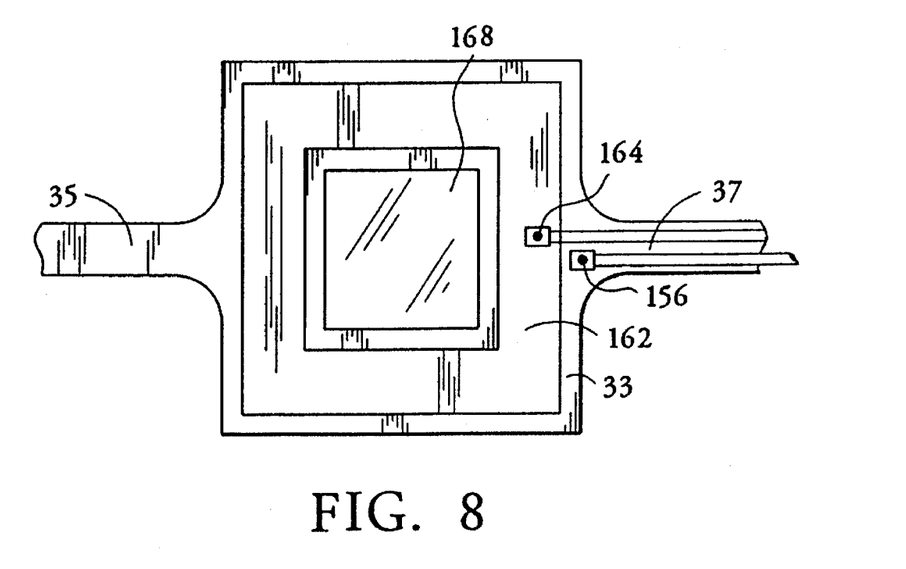
FIG. 8 is a top view of a combined micro scanner and aligned photodetector in accord with the present invention.

In FIG. 8, an integrated mirror and photodiode arrangement is shown. The central mirror region 168 formed of silicon, possibly metal coated, is surrounded by a photodiode array 162. For example, if the silicon is n-type, a p implant can be made in this region and p$^+$ contact 164 is used to make contact to the diode. N+ contact 156 is the other lead of the diode. Standard guard regions isolate the photodiode array from the central mirror region 168 and edge of the mirror plate. Other types of photodiodes, such as pin, Schottkey, Avalanche or the like may be used, rather than the diodes described herein. The advantage of the structure of FIG. 8 is that as the central mirror region 168 oscillates, the photodetector region 162 moves with it at the same angle so that the same relationship between beam and detector position is always maintained.

Figure 9:
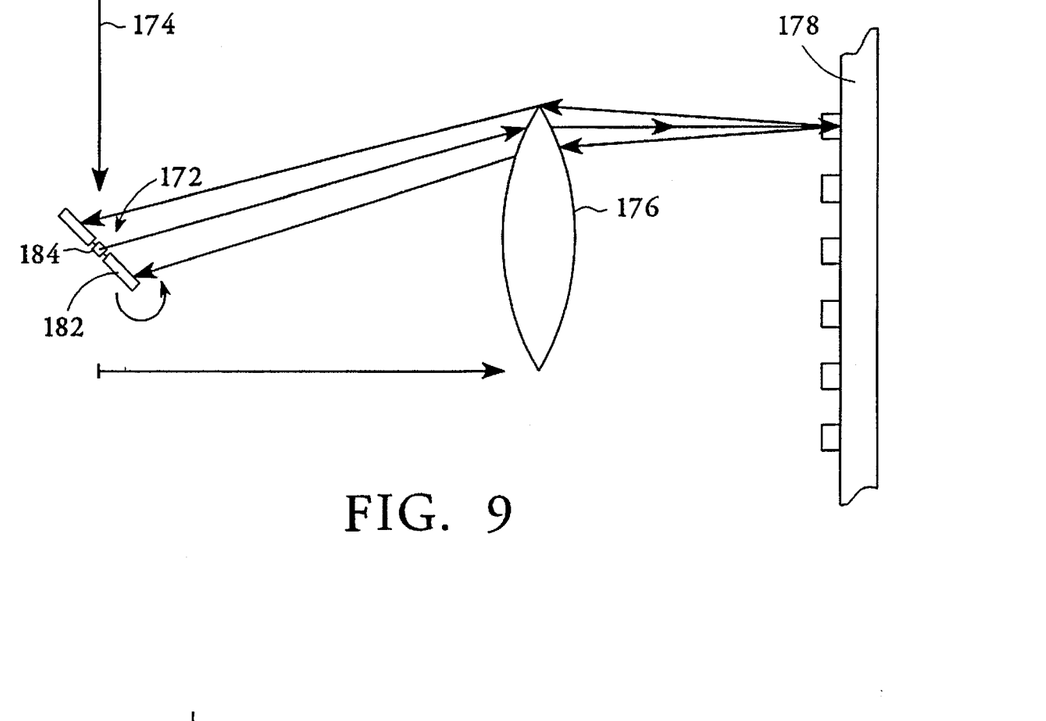
FIG. 9 is a plan view of the combined arrangement shown in FIG. 8 used in an optical scanning system.

In FIG. 9, an integrated mirror and detector arrangement 172 of the type described in FIGS. 8a and 8b is shown deflecting a beam 174 toward an f-Θ lens 176 which provides a telecentric scan over an object 178. Reflected and forward scattered light will follow the same trajectory as incident light and be detected on the peripheral detector 182 surrounding the central mirror 184. This arrangement saves several optical components which are normally associated with a separate detector.

Figure 10:
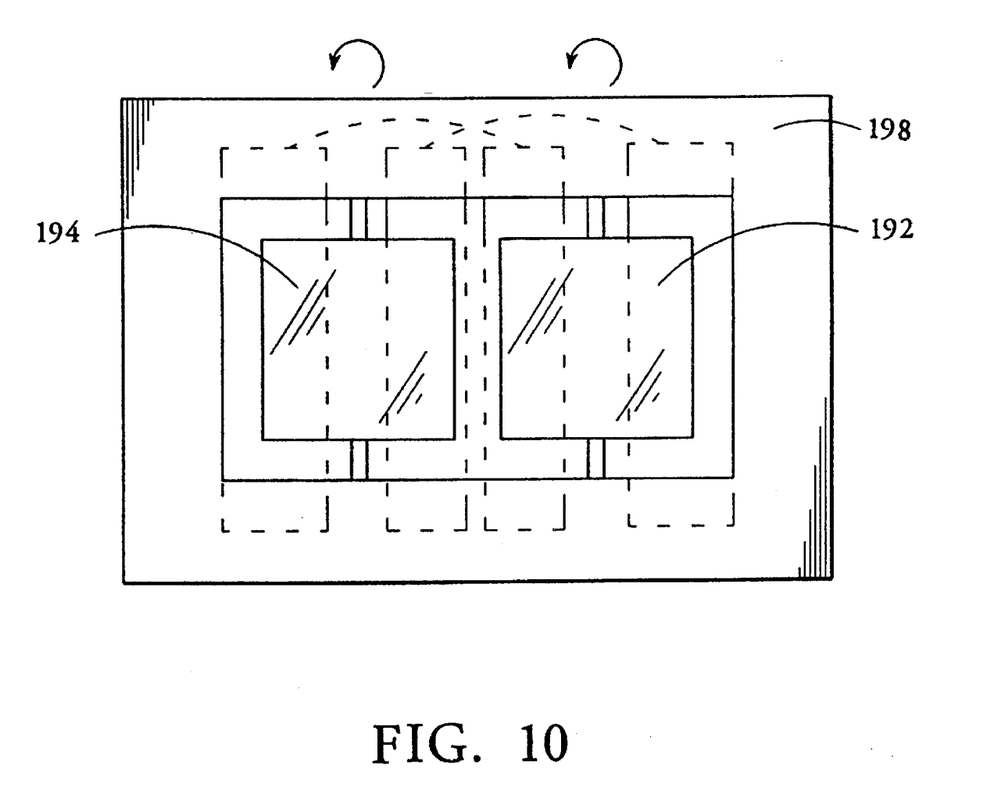
FIG. 10 is a top view of a dual in-phase micro scanner and photodetector combination in an optical scanning system.

FIG. 10 shows a tandem arrangement 198 of a micro scanner mirror 192 and a direct detector array 194, both supported in a manner previously described with reference to FIG. 6. In FIG. 10, the micro scanner mirror 192 and detector array 194 are driven in-phase, simultaneously facing in the same direction. Detectors in the detector array 194 are formed in a manner described with reference to FIG. 8 with the silicon section doped with a dopant of a first conductivity type and island implants of ions of a second conductivity type forming p-n junctions. Contact is made with the two regions where p-n junctions are formed so that photoconductive currents may be sensed.

Figure 11:
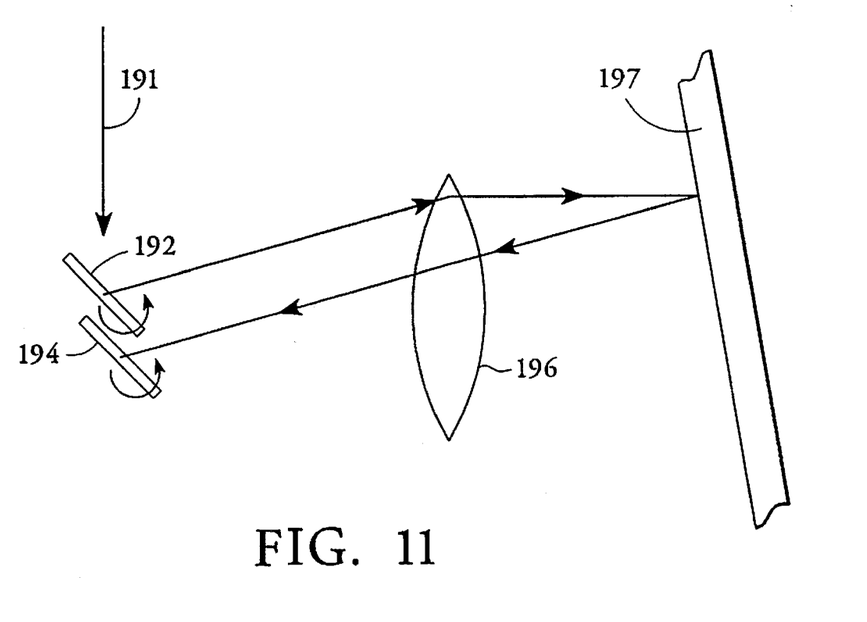
FIG. 11 is a plan view of the combined arrangement shown in FIG. 10 used in an optical scanning system.

The arrangement of a scanner detector combination is shown in FIG. 11 where the micro scanner mirror 192 deflects a beam 191 through a lens 196 to a tilted object 197 to be scanned. The reflected beam from object 197 impinges upon detector 194 which faces the same angle as the micro scanner mirror 192.

Figure 12A:
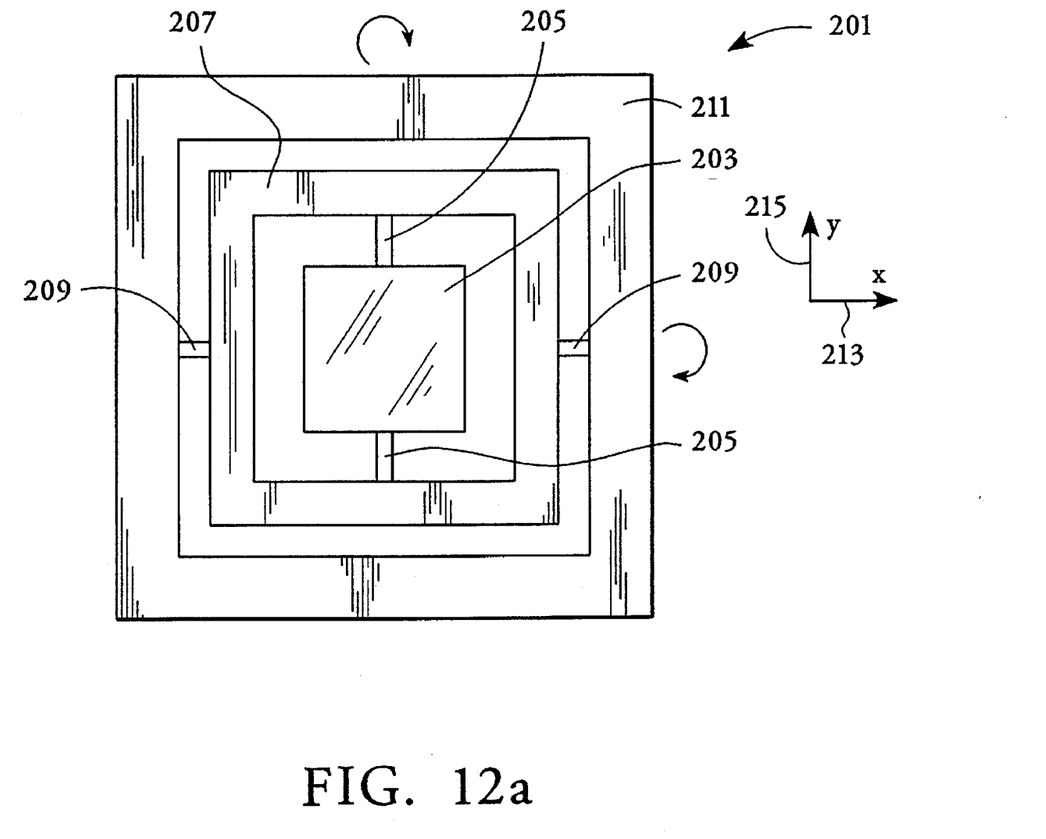
FIGS. 12a and 12b show respective top and side views of a two-dimensional micro scanner in accord with the present invention.
Figure 12B:
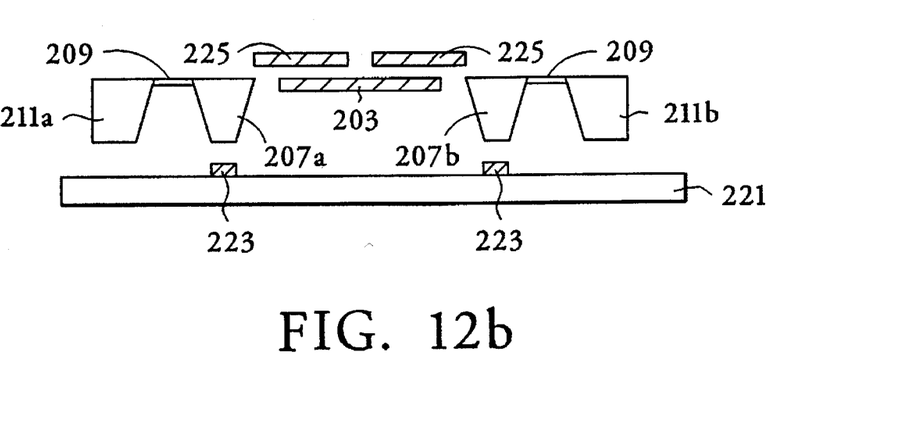

In FIGS. 12a and 12b the two-dimensional scanner 201 has a central mirror 203 supported by torsion bars 205 from a first rectangular frame 207. The rectangular frame 207 is supported by torsion bars 209 from a larger silicon section 211. In one implementation, each set of torsion bars carries the torsion sensor shown in FIG. 3. The mirror 203 and the surrounding silicon frame 207 have independent driver electrodes so that the mirror 203 can be driven at one rate while the frame 207 may be driven at a second rate. This allows raster scanning in x and y directions as indicated by arrows 213 and 215, respectively. Mirror 203 causes scanning in the x direction, indicated by arrow 213, typically at a high rate, such as the horizontal scan rate used in television. The surrounding frame 207 scans at a slower rate in the y direction indicated by arrow 215. For example, the rate may be the vertical television scan rate. It is important to compensate the minor mirror for vibration. Rotation of the axis of-minor mirror causes coriolis forces on plate 207 transmitted to torsion bars 209. Compensation with two plates, rotating in opposition, removes this effect. Plate 203 can either be a mirror, or diode array and mirror, as above. Actuating drives can be either magnetic, electrostatic, or like. Torsion sensors can also be used to scan the x-y plate at any fixed particular angle, in x or y directions, or fixed in the x-y plane and oscillating in another axis. The two-dimensional scanner of FIG. 12b could be used to deflect a laser beam onto a diffuse or phosphorescent screen. If the laser were modulated with television receiver images, a very compact substitute for a cathode ray tube is available. The two-dimensional scanner would preferably be enclosed in a vacuum housing, as earlier described, to eliminate air damping of the high frequency mirror 203. X and Y scan frequencies are usually separated by at least an order of magnitude. The outer scanner typically has a greater mass than the inner scanner, with stiffer torsion bars. This requires a higher voltage for driving the outer torsion bars but makes them less likely to respond to the driving frequency of the torsion bars of the inner scanner. Although the mass of the outer scanner is greater than the inner scanner, the mass should be as low as possible but with a large moment of inertia around the axis of rotation. A hollow frame provides such a large moment with low mass.

FIG. 12b shows the construction of the two-dimensional scanner. An insulative substrate 221 is coated with a pair of stripe electrodes 223 which are slightly spaced from the first silicon frame member side walls 207a and 207b. The inner silicon frame is spaced from the outer silicon section by the torsion bars 209 connecting with side wall members 211a and 211b. The inner mirror 203 is supported from the same silicon member as the frame 207 and the outer section 211 but is thinned in the manner previously described in order to achieve low mass. Driver electrodes 225 are supported from overhang regions in the manner described with reference to FIG. 2b. The overhang regions and thin film window associated with a container for the apparatus are not shown. Building of torsion sensors, diode leads, magnetic coils and the like requires a fairly large number of leads going over the torsion bars. It is possible to sense the resonance condition of mirror 203 on torsion bar 209; oscillation of mirror 203 causes uniaxial stresses in torsion bar 209, which can be sensed with the usual uniaxial piezo sensors built into torsion bar 209. This arrangement requires fewer leads.

In vacuum, because of the absence of viscous damping, the Q of the device becomes extremely high. Q's close to 700,000 have been measured in a vacuum of $2 \times 10^{-6}$ Torr, for a device which had a Q of 20 at atmospheric pressure at 810 Hz. A few volts is then all that is required to power the device with an electrostatic drive. This low voltage makes shielding of other peripheral devices, such as the electronics circuits for the torsion sensor or photodiode array much easier to accomplish. The Q (or the damping) of the resonator can be readily adjusted by changing the ambient pressure in which the device operates. Because the required power for oscillation is so low, one can envision a solar cell on the same piece of silicon, providing power required for the torsional oscillator. Such a power supply could also power a laser diode of a scanner for short periods of time. In this manner, the scanner of the present invention would not require any external power supply.

The micromachined scanner of the present invention is so light that it can be carried by a conventional scanner in a second, usually orthogonal axis, without any problem. Thus, a conventional scanner would provide scanning motion in one axis, say x-axis, while the scanner of the present invention would provide scanning in an orthogonal axis, say y-axis. The conventional scanner, which might be a galvanometer scanner, would operate at a lower frequency and the micromachined scanner of the present invention, which would contain the scan center, would operate at a higher frequency.

Using two dimensional scanning, together with a modulated diode laser, it is possible to make simple and inexpensive displays. For example, a very high frequency scanner can be made, by operating the micro scanner in vacuum. For example, using a 10 micron thick mirror, 800 micron square, with torsion bars 20 microns wide and 200 microns long, the resonance is on the order of 15,000 Hz. This is about equal to the horizontal sweep frequency of a television display (15,750 Hz). Hence, a mechanical scanner, oscillating at 60 Hz (driven by the line frequency) carries the very fast scanner in the other direction. Together they present a very inexpensive system capable of displaying television images on a phosphor screen with a 2:1 interlace. If the resonance frequency of the lower scanner is higher (say 120 Hz) for ease of operation, then a 4:1 interlacing scheme needs to be used to obtain 30 frames a second. No electron beam is used. The x and y drives are preferably linear, rather than sinusoidal drives, using a magnetic drive and the torsion sensor. Four terminal piezosensors have been suggested as angle sensors for self-oscillation. Capacitive sensors have been used for self-oscillation, (R. N. Kleiman et al., Rev.Sci.Instrum., vol. 56, 11, 1985), because they are less expensive. When the oscillator is enclosed in a vacuum box, capacitive sensors may be preferred, because no leads need to go through the vacuum package. Well known micromachining techniques exist for providing corrugations around the mirror periphery. This enhances mirror flatness greatly, while affecting the mass very little.

We claim:

1. A torsional scanner comprising:
a planar micromachined mirror formed in a surface layer of a silicon wafer section, said mirror having a mirror surface;
a pair of opposed torsion bars for supporting said mirror as an island within the wafer section, said mirror thus supported within the wafer section by said torsion bars exhibiting a plurality of vibrational modes including a principal torsional vibrational mode about an axis that is collinear with said torsion bars, a vertical shaking vibrational mode, a vertical rocking vibrational mode, a lateral shaking vibrational mode, and a lateral rocking vibrational mode, each such vibrational mode of said mirror having a vibrational frequency, the vibrational frequency of the principal torsional vibrational mode being lower by at least 20% than the vibrational frequency of any other vibrational mode of said mirror; and
drive means for communicating a reciprocating torsional force to said mirror, thereby establishing a rotary motion of said mirror about the axis that is collinear with said torsion bars.

2. The scanner of claim 1 wherein said mirror surface is disposed on one side of said silicon wafer section, and the drive means comprises a pair of planar, spaced apart drive electrodes communicating force to said mirror from the side of the mirror on which the mirror surface is disposed.

3. The scanner of claim 1 wherein a second mirror surface is disposed on a side of said silicon section opposite said first mirror surface.

4. The scanner of claim 1 wherein each torsion bar connects to the silicon wafer section by a rounded hinge portion.

5. The scanner of claim 1 wherein said drive means includes:
a magnetic field means disposed adjacent to the mirror; and
a conductive coil carried on said mirror surface that is in a galvanometric relationship with said magnetic field means whereby a torque is applied to said mirror and said torsion bars if an electric current flows through said conductive coil.

6. The scanner of claim 1 wherein said torsional scanner further comprises an evacuated enclosure surrounding said mirror and torsion bars, and said evacuated enclosure includes a window transmissive of light that faces said mirror.

7. A micromachined scanner assembly comprising:
a micromachined mirror formed on a surface of a silicon wafer island supported within a first wafer section by a pair of opposed torsion bars, said mirror thus supported within the wafer section by said torsion bars exhibiting a plurality of vibrational modes including a principal torsional vibrational mode about an axis that is collinear with said torsion bars, a vertical shaking vibrational mode, a vertical rocking vibrational mode, a lateral shaking vibrational mode, and a lateral rocking vibrational mode, each such vibrational mode of said mirror having a vibrational frequency, the vibrational frequency of the principal torsional vibrational mode being lower by at least 20% than the vibrational frequency of any other vibrational mode of said mirror; and
magnetic drive means for communicating a torsional force to said silicon wafer island, said magnetic drive means including:
a conductive coil disposed on said silicon wafer island; and
a magnetic field means disposed adjacent to said silicon wafer island in a galvanometric relationship with said conductive coil.

8. A torsional scanner assembly comprising:

a planar frame having opposed, axially aligned torsion bars that support a planar, central mirror plate, said frame, torsion bars and mirror plate all monolithically fabricated from a planar semiconductor stress-free single crystal silicon layer of a substrate; said central mirror plate thus supported within the planar frame by said torsion bars having a center, defining a mirror rest plane if no external force is applied to said central mirror plate, and also exhibiting a plurality of vibrational modes including a principal torsional vibrational mode about an axis that is collinear with said torsion bars, a vertical shaking vibrational mode, a vertical rocking vibrational mode, a lateral shaking vibrational mode, and a lateral rocking vibrational mode, each such vibrational mode of said central mirror plate having a vibrational frequency, the vibrational frequency of the principal torsional vibrational mode being lower by at least 20% than the vibrational frequency of any other vibrational mode of said central mirror plate; and drive means for imparting rotary motion to said central mirror plate about the axis that is collinear with said torsion bars.

9. The scanner of claim 8 wherein said central mirror plate has front and back sides, and said drive means comprises a pair of electrodes spaced apart from the front side of the central mirror plate, the electrodes being displaced from the torsion bars.

10. The scanner of claim 9 wherein said drive means includes means for applying voltage first to one electrode and then to the other electrode in an oscillatory manner.

11. The scanner of claim 8 wherein said central mirror plate has front and back sides, and said drive means comprises a pair of electrodes spaced apart from the back side of the central mirror plate, the electrodes being displaced from the torsion bars.

12. The scanner of claim 11 wherein said drive means includes means for applying voltage first to one electrode and then to the other electrode in an oscillatory manner.

13. The scanner of claim 8 wherein said central mirror plate has front and back sides and said drive means comprises two pairs of electrodes, a first pair spaced apart from the front side of the central mirror plate and a second pair spaced apart from the back side of the central mirror plate, the electrodes spaced apart both from the front side and from the back side of the central mirror plate being displaced from the torsion bars.

14. The scanner of claim 13 wherein said drive means includes means for applying voltage in an oscillatory manner first to a first pair of electrodes arranged diagonally across the torsion bars, and then to a second pair of electrodes arranged diagonally across the torsion bars.

15. The scanner of claim 8 wherein said drive means comprises:

means for applying a magnetic field substantially parallel to the mirror rest plane of said central mirror plate; and a coil means disposed on said central mirror plate and in the magnetic field.

16. The scanner of claim 8 wherein said single crystal silicon layer is in a Simox wafer.

17. The scanner of claim 8 wherein said single crystal silicon layer is in a silicon-on-insulator wafer.

18. The scanner of claim 8 further comprising torsion sensing means disposed on one of said torsion bars for generating a torsion signal that indicates angular deflection of said central mirror plate.

19. The scanner of claim 18 wherein said torsion sensing means comprises at least three electrical contacts on said torsion bar, and means for applying an electric current across at least a pair of said contacts, and the torsion signal is sensed from a pair of said contacts.

20. The scanner of claim 19 wherein an A.C. current is applied across the pair of contacts whereby the torsion signal becomes a modulation envelope of that A.C. current.

21. The scanner of claim 18 wherein said torsion sensing means comprises:

at least four electrical contacts disposed on said torsion bar with a pair of said contacts being disposed along a line that is substantially parallel to the axis for the principal torsional vibrational mode, which axis is collinear with said torsion bars; and means for applying an electric current across a first pair of said contacts while the torsion signal is sensed from a second pair of said contacts oriented perpendicular to a line joining the first pair of said contacts.

22. The scanner of claim 21 wherein an A.C. current is applied across the pair of contacts whereby the torsion signal becomes a modulation envelope of that A.C. current.

23. The scanner of claim 8 further comprising torsion sensing means disposed on one of said torsion bars for generating a torsion signal that is fed back for establishing oscillation of said central mirror plate at the vibrational frequency of the principal torsional vibrational mode of said central mirror plate.

24. The scanner of claim 23 wherein said torsion sensing means comprises at least three electrical contacts on said torsion bar, and means for applying an electric current across at least a pair of said contacts, and the torsion signal is sensed from a pair of said contacts.

25. The scanner of claim 24 wherein an A.C. current is applied across the pair of contacts whereby the torsion signal becomes a modulation envelope of that A.C. current.

26. The scanner of claim 23 wherein said torsion sensing means comprises:

at least four electrical contacts disposed on said torsion bar with a pair of said contacts being disposed along a line that is substantially parallel to the axis for the principal torsional vibrational mode, which axis is collinear with said torsion bars; and means for applying an electric current across a first pair of said contacts while the torsion signal is sensed from a second pair of said contacts oriented perpendicular to a line joining the first pair of said contacts.

27. The scanner of claim 26 wherein an A.C. current is applied across the pair of contacts whereby the torsion signal becomes a modulation envelope of that A.C. current.

28. The scanner of claim 8 wherein said central mirror plate is disposed in a sealed vacuum housing having a transparent thin film window over the central mirror plate.

29. The scanner of claim 28 wherein said thin film window is selected from the group of silicon nitride, silicon carbide, boron nitride, oxynitride or silicon.

30. The scanner of claim 8 wherein said semiconductor substrate is a silicon material which has both a <100> crystallographic direction and a <110> crystallographic direction, and said torsion bars are oriented in the <110> direction for an n-type silicon layer.

31. The scanner of claim 8 wherein said semiconductor substrate is a silicon material which has both a <100> crystallographic direction and a <110> crystallographic direction, and said torsion bars are oriented in the <100> direction for a p-type silicon layer.

32. The scanner of claim 8 wherein said central mirror plate has a central mirror portion surrounded by a light detector portion, both portions moving together.

33. The scanner of claim 8 wherein said torsion bars are joined to said frame with rounded corners.

34. The scanner of claim 8 wherein said torsion bars have a surface layer of silicon carbide or silicon nitride.

35. The scanner of claim 8 wherein said planar frame is mounted on a second scanner having a scan axis that is not parallel to the axially aligned torsion bars supporting the central mirror plate.

36. The scanner of claim 35 wherein said second scanner comprises:

a larger silicon section that encompasses said planar frame, torsion bars and central mirror plate; and a second pair of axially aligned torsion bars disposed between said planar frame and said larger silicon section for supporting said planar frame within said larger silicon section;

said second pair of torsion bars and larger silicon section being fabricated from the same planar semiconductor stress-free single crystal silicon layer as said central mirror plate, torsion bars, and planar frame; said second pair of torsion bars being oriented collinear with the scan axis of said second scanner whereby said second pair of torsion bars permits rotation of said planar frame about the scan axis.

37. The scanner of claim 36 further comprising second drive means for imparting rotary motion to said planar frame about the scan axis of said second scanner.

38. The scanner of claim 37 wherein one of said drive means employs electrostatic force, and the other drive means employs magnetic force.

39. The scanner of claim 37 wherein said drive means for imparting rotary motion to said central mirror plate employs electrostatic force, and said second drive means for imparting rotary motion to said planar frame employs magnetic force.

40. The scanner of claim 8 wherein the central mirror plate is substantially thinner than the planar frame.

41. The scanner of claim 8 wherein mass around the center of said central mirror plate is mostly etched away.

\* \* \* \* \*